US009542435B2

(12) United States Patent
Kinugawa et al.

(10) Patent No.: US 9,542,435 B2
(45) Date of Patent: Jan. 10, 2017

(54) SEARCH SYSTEM, SEARCH METHOD, SEARCH PROGRAM AND STORAGE MEDIUM FOR PROVIDING A STABILIZED NUMBER OF OUTPUT SEARCH RESULTS

(75) Inventors: Tatsuya Kinugawa, Tokyo (JP); Teppei Ishiomaru, Tokyo (JP); Shimpei Yamamoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 262 days.

(21) Appl. No.: 13/637,259

(22) PCT Filed: Mar. 24, 2011

(86) PCT No.: PCT/JP2011/057191
§ 371 (c)(1),
(2), (4) Date: Nov. 15, 2012

(87) PCT Pub. No.: WO2011/118712
PCT Pub. Date: Sep. 29, 2011

(65) Prior Publication Data
US 2013/0073585 A1    Mar. 21, 2013

(30) Foreign Application Priority Data
Mar. 26, 2010    (JP) .................... 2010-073488

(51) Int. Cl.
*G06F 17/30* (2006.01)
*G06Q 30/02* (2012.01)

(52) U.S. Cl.
CPC ......... *G06F 17/30395* (2013.01); *G06Q 30/02* (2013.01)

(58) Field of Classification Search
CPC ............ G06F 17/30864; G06F 17/3087; G06F 17/30554; G06F 17/30; G06F 17/30648; G06F 17/30029; G06F 17/30241
(Continued)

(56) References Cited

U.S. PATENT DOCUMENTS 6,865,571 B2 *  3/2005  Inaba ............. G06F 17/30699
2001/0044754 A1 * 11/2001  Fujii ..................... G06Q 30/06
                                                        705/26.62
(Continued)

FOREIGN PATENT DOCUMENTS

JP        11-161659 A      6/1999
JP     2000-331011 A     11/2000
(Continued)

OTHER PUBLICATIONS

Communication dated Jul. 6, 2016, from the European Patent Office in counterpart European application No. 11759517.3.

*Primary Examiner* — Tony Mahmoudi
*Assistant Examiner* — Michael Le
(74) *Attorney, Agent, or Firm* — Sughrue Mion, PLLC

(57) ABSTRACT

A search condition acquisition section acquires search conditions associated with a plurality of elements having a hierarchical structure. A search processing execution section executes search processing for identifying, as search results, pieces of search target data associated with respectively corresponding elements in all the tiers that correspond to the elements included in the search condition. An information output section outputs search result information under the condition that the number of pieces of identified search target data is equal to or larger than a predetermined number N. Under the condition that the number of pieces of identified search target data is not equal to or larger than the predetermined number N, the search processing execution section executes the search processing on elements in all the tiers associated with the search condition changed so as to cancel the association with the element in a lowermost tier.

9 Claims, 10 Drawing Sheets

(58) Field of Classification Search
USPC .......................................................... 707/769
See application file for complete search history.

(56) References Cited

U.S. PATENT DOCUMENTS

| | | | |
|---|---|---|---|
| 2002/0087408 A1* | 7/2002 | Burnett | 705/14 |
| 2004/0044638 A1* | 3/2004 | Wing | G06Q 10/10 |
| 2004/0260730 A1* | 12/2004 | Iwama | G06F 17/30876 |
| 2005/0144052 A1 | 6/2005 | Harding et al. | |
| 2005/0222981 A1* | 10/2005 | Lawrence | G06F 17/30864 |
| 2006/0224938 A1* | 10/2006 | Fikes | G06F 17/30876 |
| | | | 715/234 |
| 2007/0032948 A1* | 2/2007 | Kato | G01C 21/00 |
| | | | 701/533 |
| 2007/0203887 A1 | 8/2007 | Dynin | |
| 2008/0065605 A1* | 3/2008 | Bourland | G06F 17/30554 |
| 2009/0204783 A1* | 8/2009 | Lyle | G06F 17/30286 |
| | | | 711/202 |

FOREIGN PATENT DOCUMENTS

| | | |
|---|---|---|
| JP | 2002-092033 A | 3/2002 |
| JP | 2004-094936 A | 3/2004 |
| JP | 2005-173847 A | 6/2005 |
| JP | 2006-258658 A | 9/2006 |
| JP | 2009-140444 A | 6/2009 |

* cited by examiner

| USER ID | USER NAME CHARACTER STRING | |
|---------|---------------------------|---|
| 0001 | ○○○○ | } 50 |
| 0002 | ×××× | } 50 |

| TOKYO-TO | ................................................ |
| --- | --- |
| | ................................................ |
| | "SA" ROW |
| | SHINAGAWA-KU  SHIBUYA-KU  SHINJUKU-KU  SUGINAMI-KU |
| | SUMIDA-KU  SETAGAYA-KU |
| | "TA" ROW |

| SHINAGAWA-KU | ................................................ |
| --- | --- |
| | ................................................ |
| | "HA" ROW |
| | HATANODAI  HIGASHIOI  HIGASHI GOTANDA  HIGASHI SHINAGAWA |
| | HIGASHI NAKANOBU  HIGASHI YASHIO  HIRATSUKA  HIROMACHI |
| | FUTABA |
| | "MA" ROW |

52

SEARCH SYSTEM, SEARCH METHOD, SEARCH PROGRAM AND STORAGE MEDIUM FOR PROVIDING A STABILIZED NUMBER OF OUTPUT SEARCH RESULTS

CROSS REFERENCE TO RELATED APPLICATIONS

This application is a National Stage of International Application No. PCT/JP2011/057191, filed on Mar. 24, 2011, which claims priority from Japanese Patent Application No. 2010-073488, filed on Mar. 26, 2010, the contents of all of which are incorporated herein by reference in their entirety.

TECHNICAL FIELD

The present invention relates to a search system, a search method, a search program, and a storage medium.

BACKGROUND ART

In recent years, mail-order business using the Internet has become prevalent. The mail-order businesses include, for example, businesses that utilize delivery sites that allow users to use food delivery/package delivery/on-site services online. On the delivery site, in general, a shop search system for searching for a shop of a delivery company or a service provider which is desired by the user or other such system is utilized.

The general search systems including the shop search system are designed to improve convenience of users in searches. For example, Patent Literature 1 discloses a data management device including means for managing attribute values of all features existing in respective layers collectively on an attribute name basis, to thereby allow a search at a high speed by narrowing down features that match the attribute name and the attribute value which are designated as conditions.

CITATION LIST

Patent Literature

[Patent Literature 1] JP 2000-331011 A

SUMMARY OF INVENTION

Technical Problem

In a conventional shop search system utilized on a delivery site and the like, a condition relating to a location and an area of a shop is received from a user, and shops that match the condition are output in a list form as search results. However, if the number of shops output as the search results is small, the list of the search results exhibits sparsity, which may arouse the user's suspicion that the delivery site has a small number of shops registered and is not being utilized very often. This is not desirable in terms of business, which creates a demand to cause the list of the search results to exhibit liveliness.

In this case, it is conceivable to output a predetermined number of shops as the search results in ascending order of a distance from the location and the area that are designated by the user to the shop. However, if the shop search system employs this method, it is necessary to execute information processing such as calculation of site-to-site distances and prioritization of the shops based on the distances, which may increase a response time of the shop search system. This can be one of causes that irritate the user.

Further, for example, in a product search system used in mail-order businesses, products and services to be sales targets may be managed by being categorized in a hierarchical structure. In such a product search system, when products and services that match the condition relating to the category are output in a list form as search results, if the number of products and services output as the search results is small, the list of the search results exhibits sparsity. If the product search system is configured to calculate a strength of a relationship between a category of the products and services designated by the user and the category of each of the products and services to be search targets by using a predetermined calculation method and to output a predetermined number of products and services as the search results in descending order of the strength of the relationship with the category of the products and services designated by the user, it is necessary to execute information processing such as prioritization of the strength of the relationship between the categories, which may increase a response time of the product search system.

The above-mentioned issues are not limited to the shop search system or the product search system, but also apply to general search systems.

The present invention has been made in view of the above-mentioned problems, and an object thereof is to stabilize the number of output search results while preventing a response time from increasing.

Solution to Problem

In order to solve the above-mentioned problem, according to the present invention, there is provided a search system, including: search condition acquisition means for acquiring, from search target data storage means for storing search target data in which elements having a hierarchical structure are respectively associated with a plurality of tiers, a search condition including an element in each of the plurality of tiers; search processing execution means for executing search processing for identifying pieces of search target data associated with respectively corresponding elements in all the tiers that correspond to the elements included in the search condition, among pieces of the search target data stored in the search target data storage means; search result information output means for outputting, under the condition that a number of the identified pieces of search target data is equal to or larger than a predetermined number, search result information including the identified pieces of search target data; and search condition changing means for excluding, under the condition that the number of the identified pieces of search target data is not equal to or larger than the predetermined number, an element in a lowermost tier from the search condition, in which the search processing execution means executes, under the condition that the search condition is changed, the search processing again by using the changed search condition.

According to the present invention, there is also provided a search method, including: a search condition acquisition step of acquiring, by a computer, from search target data storage means for storing search target data in which elements having a hierarchical structure are respectively associated with a plurality of tiers, a search condition including an element in each of the plurality of tiers; a search processing execution step of executing, by the computer, search processing for identifying pieces of search target data associated with respectively corresponding elements in all the tiers that correspond to the elements included in the search condition, among pieces of the search target data stored in the search target data storage means; a search result information output step of outputting, by the computer, under the condition that a number of the identified pieces of search target data is equal to or larger than a predetermined number, search result information including the identified pieces of search target data; and a search condition changing step of excluding, by the computer, under the condition that the number of the identified pieces of search target data is not equal to or larger than the predetermined number, an element in a lowermost tier from the search condition, in which the search processing execution step is a step of executing, under the condition that the search condition is changed, the search processing again by using the changed search condition.

Further, according to the present invention, there is further provided a search program for causing a computer to function as: search condition acquisition means for acquiring, from search target data storage means for storing search target data in which elements having a hierarchical structure are respectively associated with a plurality of tiers, a search condition including an element in each of the plurality of tiers; search processing execution means for executing search processing for identifying pieces of search target data associated with respectively corresponding elements in all the tiers that correspond to the elements included in the search condition, among pieces of the search target data stored in the search target data storage means; search result information output means for outputting, under the condition that a number of the identified pieces of search target data is equal to or larger than a predetermined number, search result information including the identified pieces of search target data; and search condition changing means for excluding, under the condition that the number of the identified pieces of search target data is not equal to or larger than the predetermined number, an element in a lowermost tier from the search condition, in which the search processing execution means executes, under the condition that the search condition is changed, the search processing again by using the changed search condition.

According to the present invention, there is further provided a storage medium having a search program stored thereon, the search program causing a computer to function as: search condition acquisition means for acquiring, from search target data storage means for storing search target data in which elements having a hierarchical structure are respectively associated with a plurality of tiers, a search condition including an element in each of the plurality of tiers; search processing execution means for executing search processing for identifying pieces of search target data associated with respectively corresponding elements in all the tiers that correspond to the elements included in the search condition, among pieces of the search target data stored in the search target data storage means; search result information output means for outputting, under the condition that a number of the identified pieces of search target data is equal to or larger than a predetermined number, search result information including the identified pieces of search target data; and search condition changing means for excluding, under the condition that the number of the identified pieces of search target data is not equal to or larger than the predetermined number, an element in a lowermost tier from the search condition, in which the search processing execution means executes, under the condition that the search condition is changed, the search processing again by using the changed search condition.

In the present invention, the search results are identified based on correlations among the elements in all the tiers, and hence there is no need to execute the information processing such as the calculation of the site-to-site distances, the prioritization of the shops based on the distances, and the prioritization of the strength of the relationship between the categories. For that reason, it is possible to prevent the response time from increasing. Further, in the present invention, under the condition that the number of pieces of search target data identified as the search results is not equal to or larger than the predetermined number, the element in the lowermost tier is excluded from the search condition so as to loosen the search condition, and the changed search condition is used to execute the search processing again. Under the condition that the number of pieces of search target data identified as the search results becomes equal to or larger than the predetermined number, the search result information including the identified search target data is output. For that reason, the number of output search results is stabilized. In this manner, according to the present invention, it is possible to stabilize the number of output search results while preventing the response time from increasing.

According to an aspect of the present invention, the search condition changing means and the search processing execution means repeatedly change the search condition and execute the search processing using the changed search condition until the number of the identified pieces of search target data identified as search results becomes equal to or larger than the predetermined number.

Further, according to an aspect of the present invention, the search result information output means outputs, under the condition that the search processing is executed by using the changed search condition, the search result information in which shop data identified by the search processing using the changed search condition and shop data identified before execution of the search processing using the changed search condition are arranged in a predetermined positional relationship.

Further, according to an aspect of the present invention, the search result information output means outputs, under the condition that the search processing is executed by using the changed search condition, the search result information in which the shop data identified by the search processing using the changed search condition is arranged below the shop data identified before the execution of the search processing using the changed search condition.

Further, according to an aspect of the present invention, the search condition acquisition means acquires the search condition associated with a narrowing-down condition different from the search condition relating to the elements having the hierarchical structure, and the search processing execution means executes the search processing for identifying the search target data that satisfies the narrowing-down condition as well.

Further, according to an aspect of the present invention, the search condition relating to the elements having the hierarchical structure which have been used for the executed search processing is savable, and the search processing execution means executes, under the condition that a change request for the narrowing-down condition different from the search condition relating to the elements having the hierarchical structure is received, the search processing for identifying the search target data that satisfies the saved search condition relating to the elements having the hierarchical structure which have been used for the executed search processing and the narrowing-down condition obtained after the change.

Further, according to an aspect of the present invention, the search system further includes means for outputting the search condition for the executed search processing to history storage means for storing executed search conditions, in which the search processing execution means executes the search processing for identifying shop data that further satisfies the search condition designated from among the search conditions stored in the history storage means.

Further, according to an aspect of the present invention, the elements having the hierarchical structure are address elements, the search target data is shop data in which the address elements having the hierarchical structure are respectively associated with the plurality of tiers, and the hierarchical structure of the address elements is such a structure that an area corresponding to the address element in a lower tier is one partition obtained by dividing an area corresponding to the address element in an upper tier.

Further, according to an aspect of the present invention, the elements having the hierarchical structure are elements having the hierarchical structure regarding categories of a search target, and the hierarchical structure regarding the categories of the search target is such a structure that the category corresponding to the element in a lower tier is one of categories obtained by dividing the category corresponding to the element in an upper tier.

BRIEF DESCRIPTION OF DRAWINGS

FIG. 6B A diagram illustrating an example of the search target area narrowing-down screen.

FIG. 6C A diagram illustrating an example of the search target area narrowing-down screen.

DESCRIPTION OF EMBODIMENTS

1. First Embodiment

1-1. Configuration of System

Figure 1:
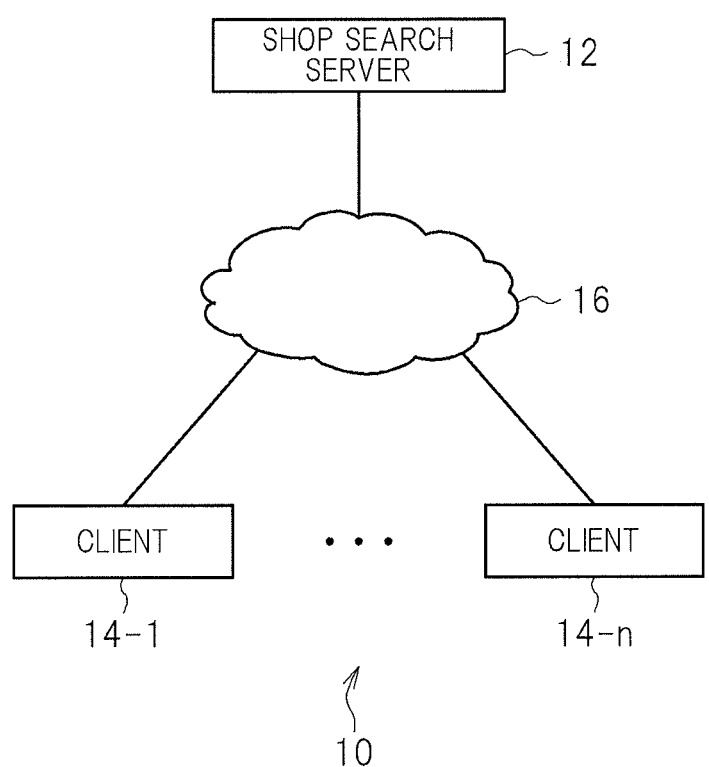
FIG. 1 A diagram illustrating an example of a configuration of a shop search system according to a first embodiment.

FIG. 1 is a diagram illustrating an example of a configuration of a shop search system 10 according to a first embodiment of the present invention being an embodiment of the present invention. As illustrated in FIG. 1, the shop search system 10 according to the first embodiment includes, for example, a shop search server 12 and clients 14 (14-1 to 14-*n*). The shop search server 12 and the clients 14 are connected to a network 16 such as the Internet, and are communicable to each other.

[1-1-1. Shop Search Server]

The shop search server 12 includes, for example, a control unit being a program control device such as a CPU, which operates in accordance with a program installed on the shop search server 12, a storage unit being a storage element such as a ROM or a RAM, a hard disk drive, or the like, and a communication unit being a communication interface such as a network board. Those components are connected to one another via a bus. The storage unit of the shop search server 12 stores a program to be executed by the control unit of the shop search server 12. Further, the storage unit of the shop search server 12 operates also as a work memory of the shop search server 12.

[1-1-2. Client (User Terminal)]

The client 14 is constituted of a known personal computer including, for example, a control device such as a CPU, a storage device being a storage element such as a ROM or a RAM, a hard disk drive, or the like, an output device such as a display, an input device such as a mouse or a keyboard, and a communication device such as a network board.

1-2. Functions of Server

Figure 2:
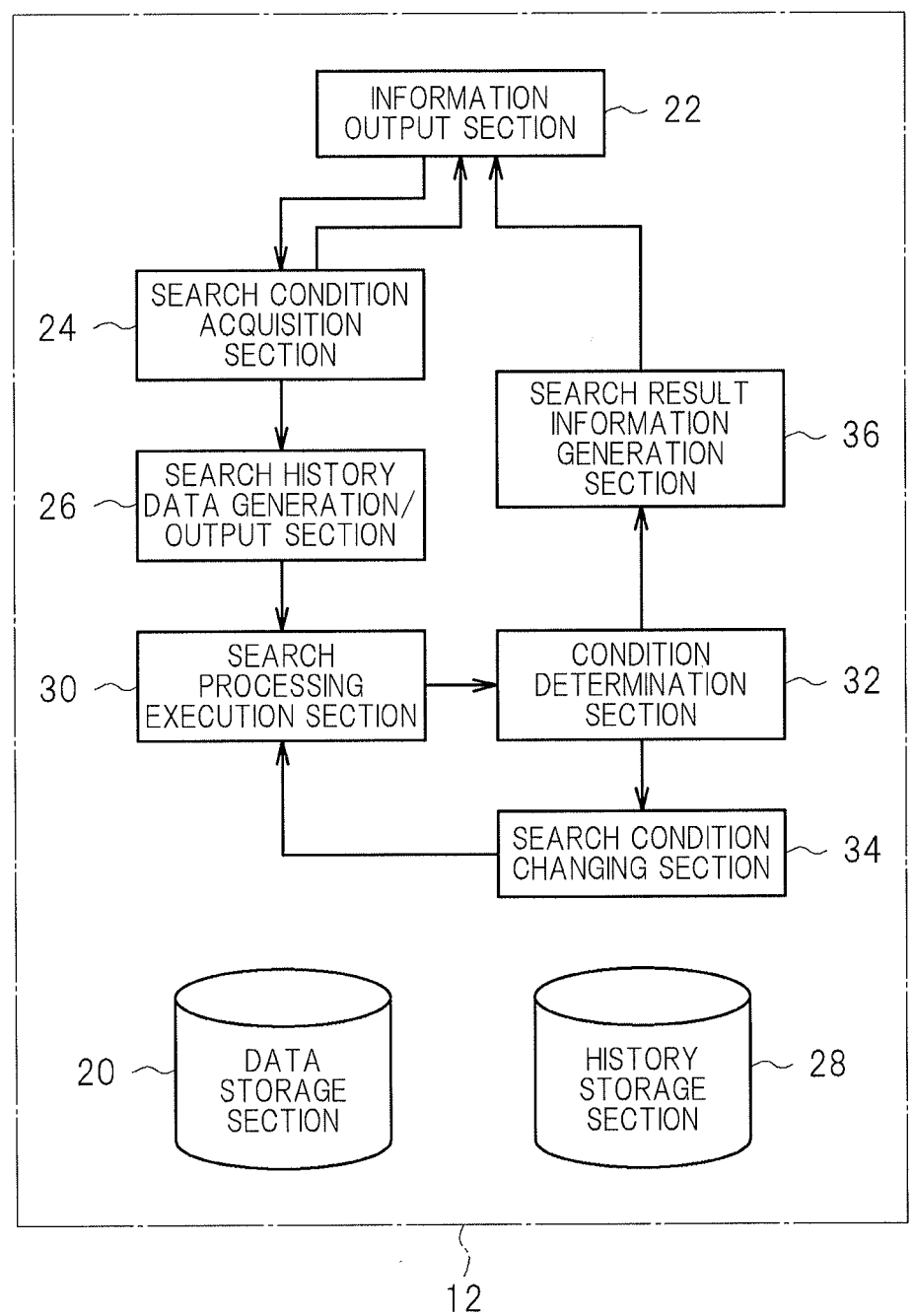
FIG. 2 A functional block diagram illustrating an example of functions implemented by the shop search system according to the first embodiment.

FIG. 2 is a functional block diagram illustrating an example of the functions implemented by the shop search server 12 according to the first embodiment.

As illustrated in FIG. 2, the shop search server 12 includes a data storage section 20, an information output section 22, a search condition acquisition section 24, a search history data generation/output section 26, a search processing execution section 30, a condition determination section 32, a search condition changing section 34, and a search result information generation section 36. The data storage section 20 and a history storage section 28 are implemented mainly by the storage unit of the shop search server 12. The other elements are implemented mainly by the control unit of the shop search server 12.

Those elements are implemented by the control unit of the shop search server 12 executing the program installed on the shop search server 12 being a computer. Note that, the program is supplied to the shop search server 12 via, for example, a computer-readable information conveyance medium (storage medium) such as a CD-ROM or a DVD-ROM, or via a communication network such as the Internet.

1-3. Items of Data

Figure 3:
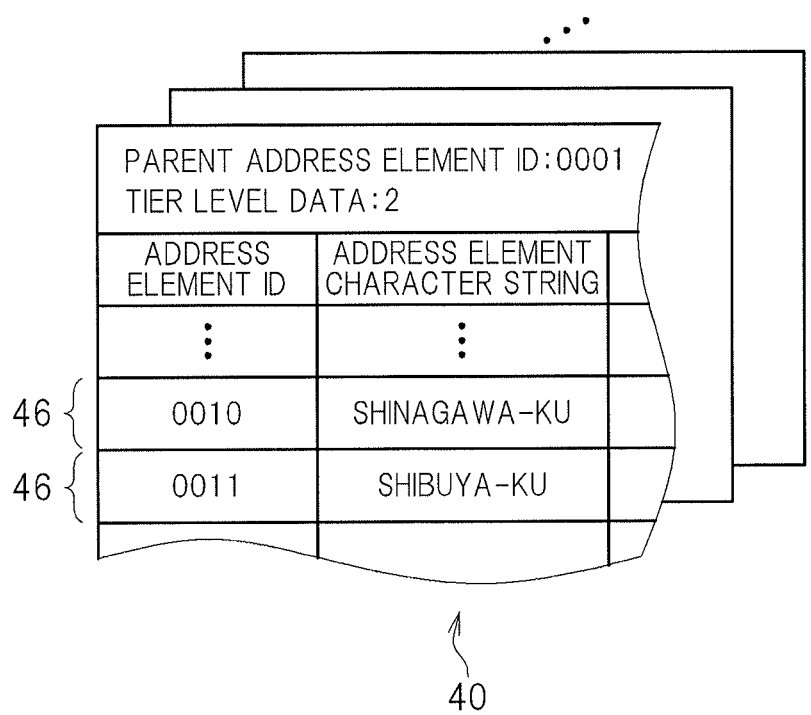
FIG. 3 A diagram illustrating an example of address management data.
Figure 4:
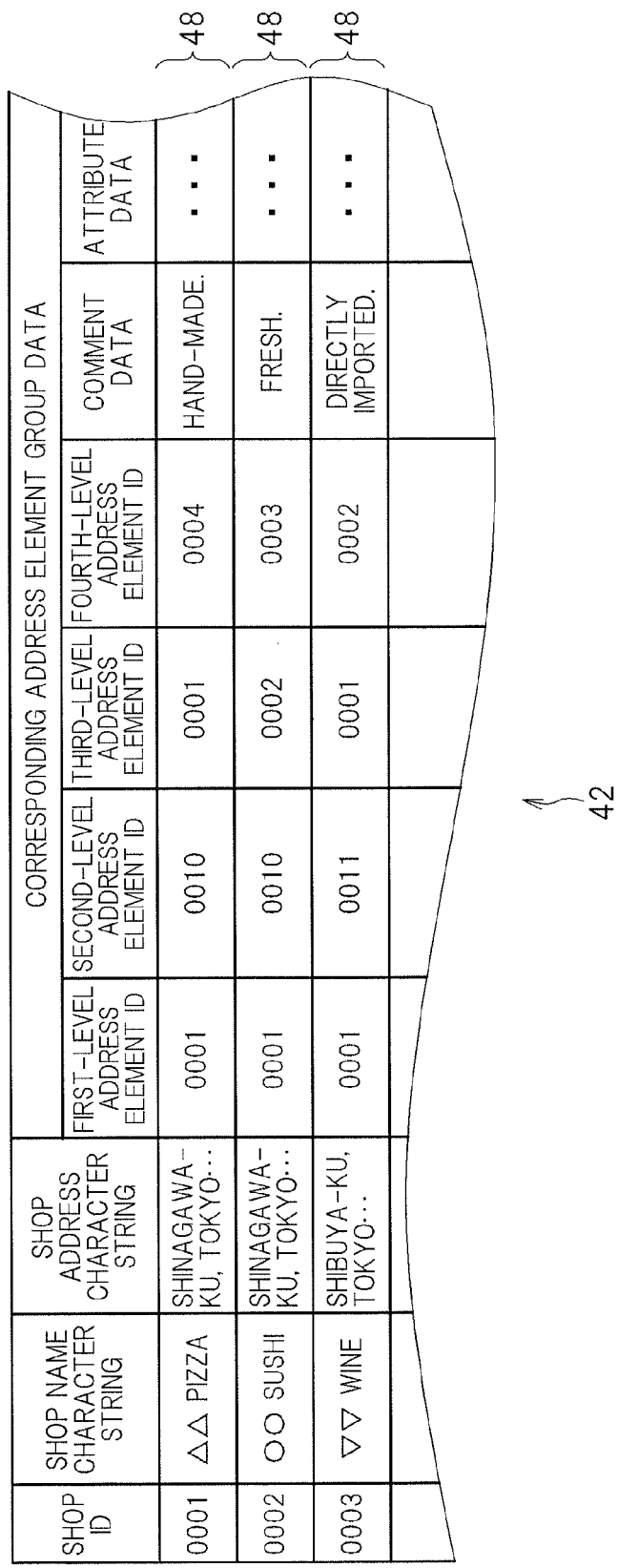
FIG. 4 A diagram illustrating an example of shop management data.
Figures 5, 6A:
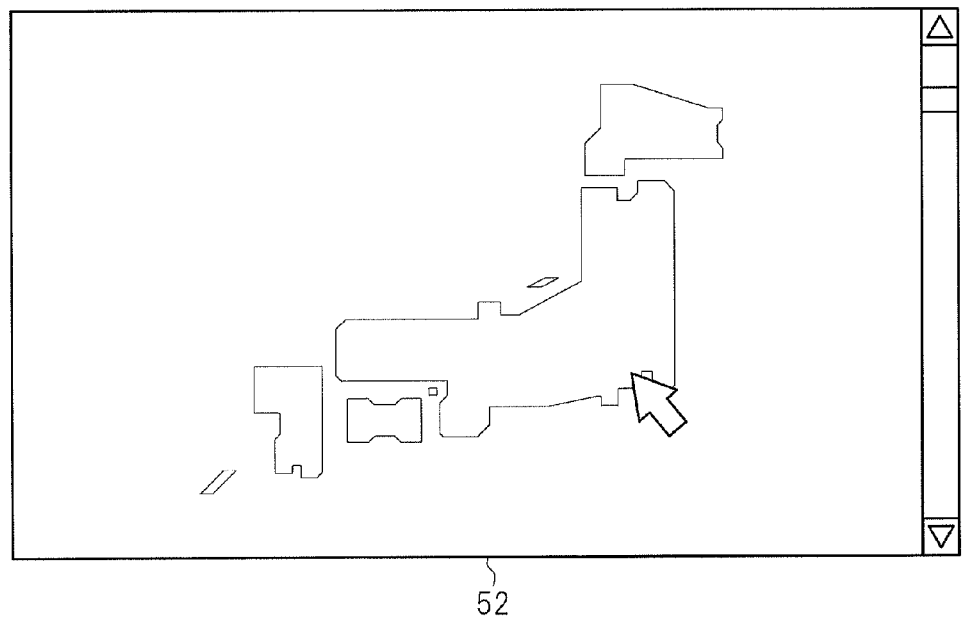
FIG. 5 A diagram illustrating an example of account management data.
FIG. 6A A diagram illustrating an example of a search target area narrowing-down screen.

In the first embodiment, the data storage section 20 stores, for example, address management data 40 illustrated in FIG. 3, shop management data 42 illustrated in FIG. 4, and account management data 44 illustrated in FIG. 5.

[1-3-1. Address Management Data]

As illustrated in FIG. 3, the address management data 40 is data on, for example, a hierarchical structure (more specifically, for example, tree structure), and includes a plurality of pieces of address element data 46. Each of the pieces of address element data 46 includes an address element ID being an identifier of the address element data 46 and an address element character string being a character string indicating a name of an element of an address corresponding to the address element data 46. Further, the address element data 46 is associated with a parent address element ID being the address element ID of the address element data 46 in an immediately-upper tier (for example, parent address element data 46) and tier level data indicating a depth of the tier of the address element data 46. In the first embodiment, for example, the address element ID is uniquely assigned to each of the pieces of address element data 46 that share the address element data 46 in the immediately-upper tier.

In the first embodiment, for example, the address element data 46 is data indicating the element of the address belonging to any one of four tiers. The tier level data takes any integer equal to or larger than one and equal to or smaller than four. Further, the hierarchical structure of the address element data 46 corresponds to the hierarchical structure of area classes. In the first embodiment, each piece of address element data 46 corresponds to one partition obtained by dividing an area corresponding to the parent address element data 46. Further, in the first embodiment, as the value of the tier level data associated with the address element data 46 becomes larger, a size of the area corresponding to the address element data 46 becomes smaller.

For example, the address element data 46 in a first tier (address element data 46 associated with the tier level data having a value of "1") corresponds to prefectures (such as, for example, "Tokyo-to" and "Osaka-fu"), the address element data 46 in a second tier corresponds to cities, wards, towns, and villages (such as, for example, "Shinagawa-ku" and "Fukushima-ku, Osaka-shi") within the prefecture corresponding to the address element data 46 associated therewith as the address element data 46 in the upper tier, and the address element data 46 in a third tier corresponds to wards and towns (such as, for example, "Higashishinagawa" and "Fukushima") within the city, ward, town, or village corresponding to the address element data 46 associated therewith as the address element data 46 in the upper tier. The address element data 46 in the fourth tier corresponds to zones (such as, for example, "4-chome" and "5-chome") within the ward or town corresponding to the address element data 46 associated therewith as the address element data 46 in the upper tier.

[1-3-2. Shop Management Data]

As illustrated in FIG. 4, the shop management data 42 includes at least one piece of shop data 48 corresponding to a shop. Each piece of shop data 48 includes a shop ID being the identifier of a shop, a shop name character string being a character string indicating the name of the shop, a shop address character string being a character string indicating the name of the address of the shop, corresponding address element group data corresponding to a combination of pieces of the address element data 46 corresponding to the address of the shop, comment data indicating a comment to be displayed as the search result, and attribute data including character strings indicating the name of a product handled in the shop, a type of the product, and the like, and an image representing the shop.

The corresponding address element group data includes, for example, a plurality of pieces of address element data 46 having a hierarchical structure, and more specifically, for example, is a combination of four ordered address element IDs (four address element IDs respectively associated with mutually different tiers). That is, the corresponding address element group data includes, for example, an n-th level address element ID being the address element ID included in the address element data 46 in an n-th tier (address element data 46 associated with the tier level data having a value of "n") (in the first embodiment, n=1, 2, 3, and 4).

[1-3-3. Account Management Data]

As illustrated in FIG. 5, account management data 44 includes a plurality of pieces of account data 50 respectively corresponding to users of the shop search system 10. The account data 50 includes, for example, a user ID being the identifier of the user and a user name character string being a character string indicating the name of the user.

1-4. Processing

[1-4-1. Acquisition Processing for the Search Condition]

Now, a description is made of an example of acquisition processing for the search condition which is performed by the shop search server 12 according to the first embodiment.

First, the information output section 22 visually outputs, for example, a search target area narrowing-down screen 52 illustrated in FIG. 6A on a display provided to the client 14. In the first embodiment, for example, the location of each of the prefectures included in the search target area narrowing-down screen 52 illustrated in FIG. 6A is associated with the address element ID included in the address element data 46 in the first tier. Under the condition that the user executes an operation for selecting Tokyo-to on the search target area narrowing-down screen 52 in the first tier illustrated in FIG. 6A by using a mouse or the like, the client 14 transmits the address element ID included in the address element data 46 in the first tier corresponding to Tokyo-to to the shop search server 12 in association with the user ID of the user of the shop search system 10. Then, the search condition acquisition section 24 of the shop search server 12 acquires the address element ID as a first-level search address element ID. Then, the information output section 22 visually outputs the search target area narrowing-down screen 52 in the second tier corresponding to Tokyo-to, which is illustrated in FIG. 6B, on the display provided to the client 14. Specifically, the information output section 22 outputs, for example, the search target area narrowing-down screen 52 including as a list the address element character strings included in the address element data 46 associated with the parent address element ID corresponding to Tokyo-to (that is, the address element data 46 corresponding to cities, towns, and villages included in Tokyo-to).

Then, for example, under the condition that the user clicks on the character string "Shinagawa-ku" by using the mouse on the search target area narrowing-down screen 52 illustrated in FIG. 6B, the client 14 transmits the address element ID included in the address element data 46 in the second tier corresponding to Shinagawa-ku to the shop search server 12 in association with the user ID of the user. Then, the search condition acquisition section 24 of the shop search server 12 acquires the address element ID as a second-level search address element ID. Then, the information output section 22 visually outputs the search target area narrowing-down screen 52 in the third tier corresponding to a combination of Tokyo-to and Shinagawa-ku, which is illustrated in FIG. 6C, on the display provided to the client 14. Specifically, the information output section 22 outputs, for example, the search target area narrowing-down screen 52 including as a list the address element character strings included in the address element data 46 associated with the parent address element ID corresponding to Shinagawa-ku (that is, the address element data 46 corresponding to towns included in Shinagawa-ku).

Figure 6D:
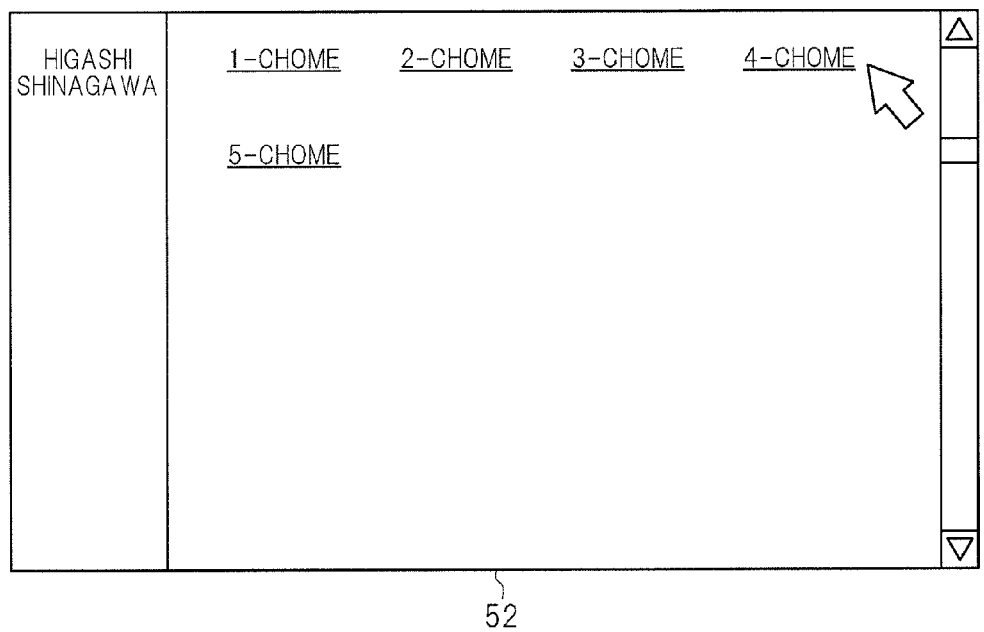
FIG. 6D A diagram illustrating an example of the search target area narrowing-down screen.

Then, for example, under the condition that the user clicks on the character string "Higashishinagawa" by using the mouse on the search target area narrowing-down screen 52 illustrated in FIG. 6C, the client 14 transmits the address element ID included in the address element data 46 in the third tier corresponding to Higashishinagawa to the shop search server 12 in association with the user ID of the user. Then, the search condition acquisition section 24 of the shop search server 12 acquires the address element ID as a third-level search address element ID. Then, the information output section 22 visually outputs the search target area narrowing-down screen 52 corresponding to a combination of Tokyo-to, Shinagawa-ku, and Higashishinagawa, which is illustrated in FIG. 6D, on the display provided to the client 14. Specifically, the information output section 22 outputs, for example, the search target area narrowing-down screen 52 including as a list the address element character strings included in the address element data 46 associated with the parent address element ID corresponding to Higashishinagawa (that is, the address element data 46 corresponding to zones included in Higashishinagawa).

Then, for example, under the condition that the user clicks on the character string "4-chome" by using the mouse on the search target area narrowing-down screen 52 illustrated in FIG. 6D, the client 14 transmits the address element ID included in the address element data 46 in the fourth tier corresponding to 4-chome to the shop search server 12 in association with the user ID of the user. Then, the search condition acquisition section 24 of the shop search server 12 acquires the address element ID as a fourth-level search address element ID.

In this manner, the shop search server 12 according to the first embodiment acquires the search condition (for example, combination of the first-level search address element ID, a second-level search address element ID, a third-level search address element ID, and a fourth-level search address element ID).

Note that, the acquisition processing for the search condition is not limited to the above-mentioned processing example.

For example, the data storage section 20 may store a zip code and a combination of the address element IDs in association with each other preliminarily. Then, the shop search server 12 may receive a designation of the zip code from the client 14, and the search condition acquisition section 24 may acquire the combination of the address element IDs stored in association with the received zip code as search address element IDs.

Further, for example, the client 14 may output at least one search address element ID selected so far and a newly selected search address element ID to the shop search server 12 in association with each other. For example, in response to a click operation on the character string "4-chome" included in the search target area narrowing-down screen 52 illustrated in FIG. 6D, the client 14 may output the fourth-level search address element ID to the shop search server 12 along with the first-level search address element ID, the second-level search address element ID, and the third-level search address element ID that have been selected so far by the user. Then, the search condition acquisition section 24 of the shop search server 12 may acquire the combination of those address element IDs as the search condition.

[1-4-2. Search Processing]

Figure 7:
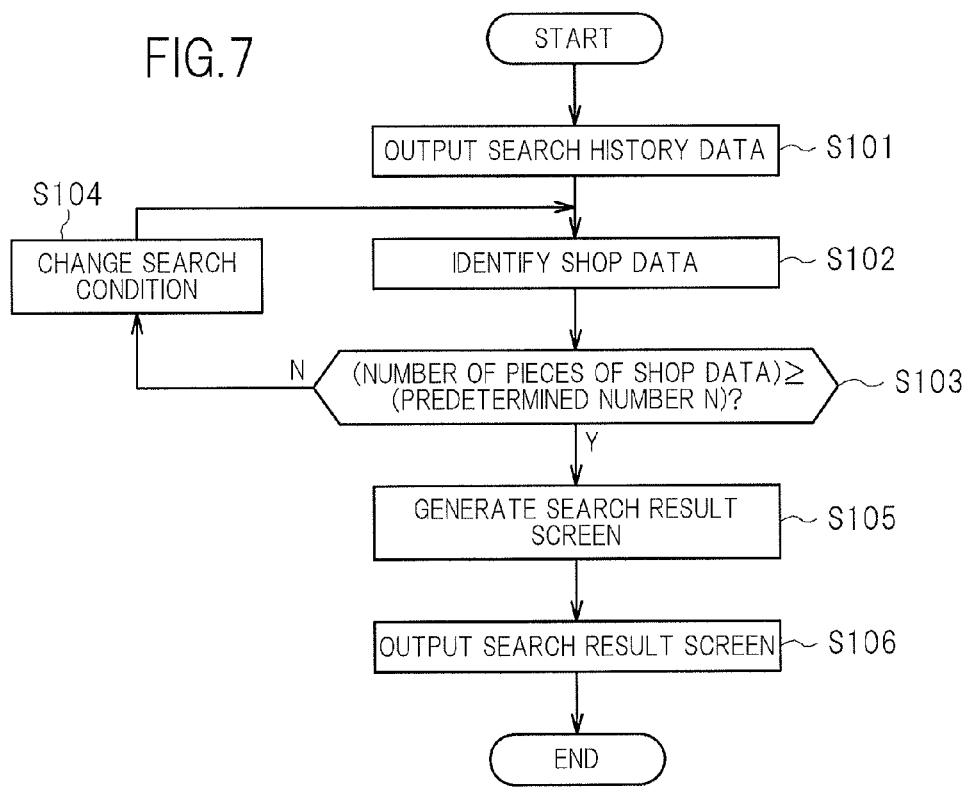
FIG. 7 A diagram illustrating an example of a flow of search processing performed by a shop search server according to the first embodiment.

Then, the shop search server 12 executes search processing for identifying the shop data 48 corresponding to the search condition (for example, combination of the first-level search address element ID, the second-level search address element ID, the third-level search address element ID, and the fourth-level search address element ID) acquired by the search condition acquisition section 24. Now, referring to the flowchart illustrated in FIG. 7, a description is made of an example of a flow of the search processing performed by the shop search server 12 according to the first embodiment.

Figure 8:
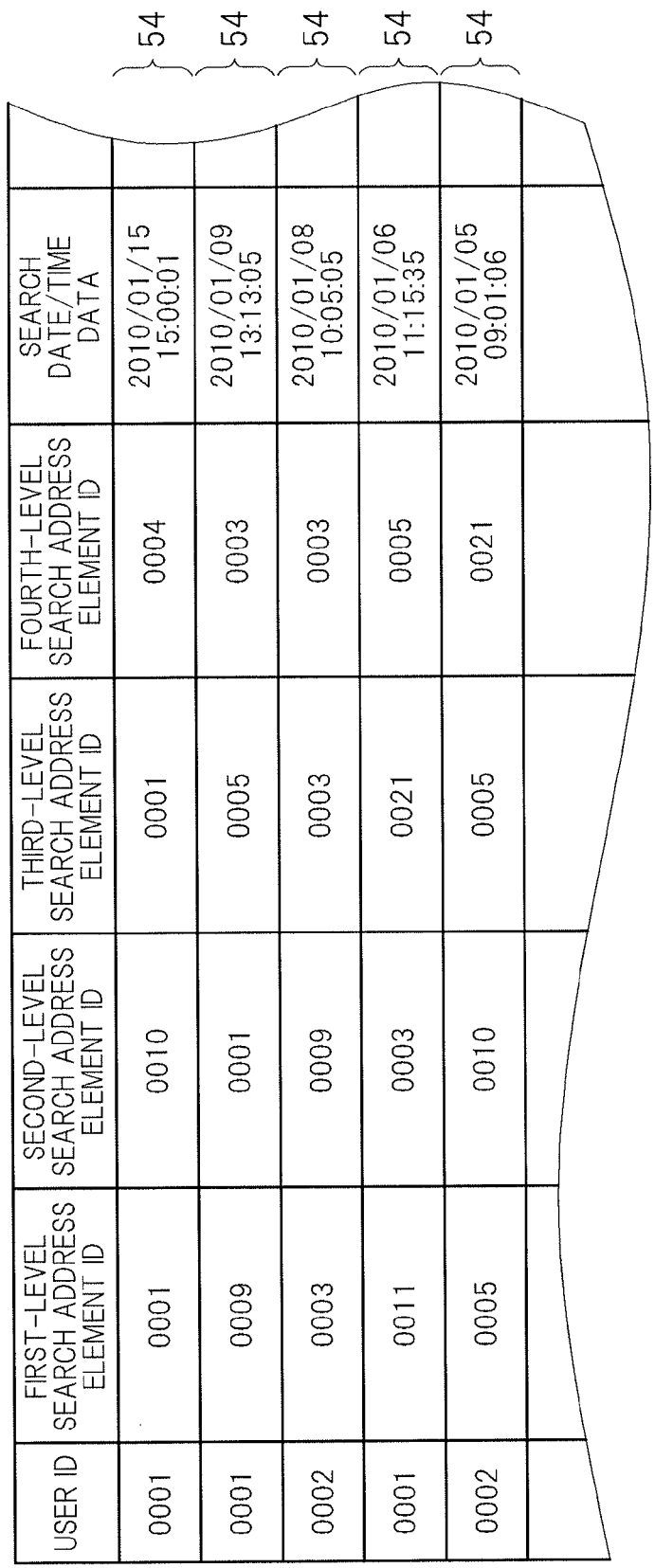
FIG. 8 A diagram illustrating an example of search history data.

First, the search history data generation/output section 26 generates search history data 54 exemplified in FIG. 8 which includes the user ID, the search condition (first-level search address element ID, second-level search address element ID, third-level search address element ID, and fourth-level search address element ID) acquired by the search condition acquisition section 24, and search date/time data indicating a date/time at which the processing indicated by this processing example is executed, and outputs the search history data 54 to the history storage section 28 (S101).

Then, the search processing execution section 30 identifies the shop data 48 associated with respectively corresponding address elements in all the tiers that correspond to the address elements included in the search condition (S102). Specifically, the search processing execution section 30 identifies, for example, the shop data 48 in which the first-level search address element ID included in the search condition matches a first-level address element ID included in the corresponding address element group data, the second-level search address element ID included in the search condition matches a second-level address element ID included in the corresponding address element group data, the third-level search address element ID included in the search condition matches a third-level address element ID included in the corresponding address element group data, and the fourth-level search address element ID included in the search condition matches a fourth-level address element ID included in the corresponding address element group data. More specifically, the search processing execution section 30 determines, for example, whether or not each piece of shop data 48 satisfies the condition regarding the above-mentioned first-level address element ID to fourth-level address element ID in order, and identifies the shop data 48 determined to satisfy the condition as the search result.

Then, the condition determination section 32 determines whether or not the number of pieces of shop data 48 identified in the processing illustrated in Step S102 satisfies a condition relating to a lower limit (for example, whether or not the number of identified pieces of shop data 48 is equal to or larger than a predetermined number N) (S103).

Under the condition that the condition is not satisfied (S103: N), the search condition changing section 34 changes the search condition so as to cancel the association with the address element in a lowermost tier (S104). Specifically, the search condition changing section 34 changes, for example, the search condition so as to exclude the fourth-level search address element ID being a search address element in the lowermost tier (so that the combination of the first-level search address element ID, the second-level search address element ID, and the third-level search address element ID becomes the search condition). Then, the search processing execution section 30 again executes the processing illustrated in Step S102 on the changed search condition. Specifically, the search processing execution section 30 identifies, for example, the shop data 48 in which the first-level search address element ID included in the search condition matches a first-level address element ID included in the corresponding address element group data, the second-level search address element ID included in the search condition matches a second-level address element ID included in the corresponding address element group data, and the third-level search address element ID included in the search condition matches a third-level address element ID included in the corresponding address element group data. More specifically, the search processing execution section 30 determines, for example, whether or not each piece of shop data 48 satisfies the condition regarding the above-mentioned first-level address element ID to third-level address element ID in order, and identifies the shop data 48 determined to satisfy the condition as the search result.

Figure 9:
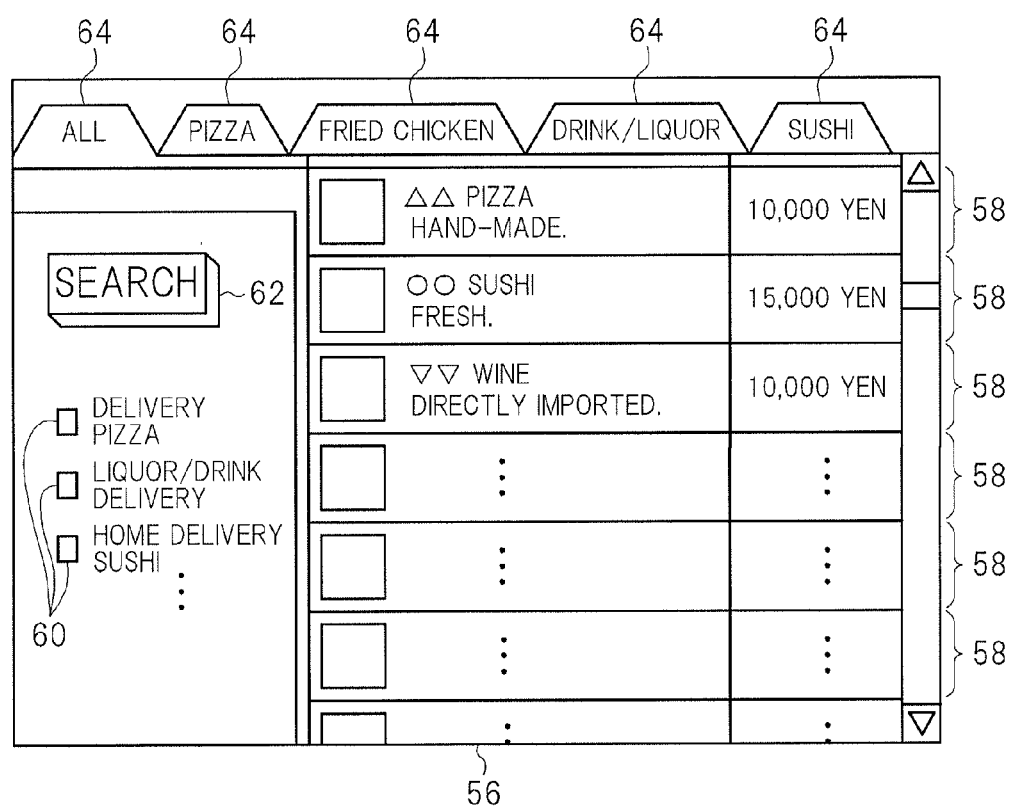
FIG. 9 A diagram illustrating an example of a search result screen.

Under the condition that the condition is satisfied in the processing illustrated in Step S103 (S103: Y), the search result information generation section 36 generates information representing the search results (in the first embodiment, for example, search result screen 56 (see FIG. 9) for showing the search result in a list form) (S105). FIG. 9 is a diagram illustrating an example of the search result screen 56.

The search result screen 56 includes a plurality of pieces of shop-related information 58 corresponding to the shop data 48 being the search results. Each piece of shop-related information 58 includes the shop name character string, the comment data, and the image included in the attribute data, which are included in the corresponding shop data 48. Further, the search result screen 56 includes product type selection check boxes 60 each of which is associated with the type of product, a search button 62, and product type selection tabs 64 each of which is associated with the type of product.

Then, in this processing example, under the condition that the search processing illustrated in the above-mentioned Step S102 (identification of the shop data 48) is executed a plurality of times, the search result information generation section 36 arranges the pieces of shop-related information 58 corresponding to the respective pieces of shop data 48 so as to have the locations within the search result screen 56 aligned from the top to the bottom based on the order of identifying the shop data 48. For that reason, the shop-related information 58 corresponding to the shop data 48 identified in the search processing executed later is placed in a lower position within the search result screen 56 than the shop-related information 58 corresponding to the shop data 48 identified in the search processing executed earlier.

Then, the information output section 22 visually outputs the search result screen 56 on the display provided to the client 14 (S106).

In this manner, in this processing example, the shop search server 12 repeats the changing of the search condition and the execution of the search processing on the changed search condition until the number of pieces of shop data 48 identified as the search results becomes equal to or larger than the predetermined number N.

In this manner, the shop search system 10 according to the first embodiment can maintain the number of pieces of shop-related information 58 included in the search result screen 56 at equal to or larger than the predetermined number N. As a result, the shop search system 10 according to the first embodiment can cause the search result screen 56 to exhibit liveliness. Further, in the identification of the search results, there is no need to execute calculation processing for site-to-site distances or sort processing for the shop data 48 based on the site-to-site distances, which can prevent a response time from increasing.

[1-4-3. Narrowing-Down/Switching of the Search Condition]

In this case, under the condition that the user clicks on the search button 62 with at least one product type selection check box 60, which corresponds to the desired type of product, being selected, the client 14 outputs a narrowing-down condition corresponding to the selected product type to the shop search server 12 in association with the user ID. Then, the shop search server 12 receives this data. Then, the shop search server 12 identifies the search history data 54 including the received user ID. Note that, under the condition that a plurality of pieces of search history data 54 are identified, the search processing execution section 30 identifies a piece of search history data 54 in which the date/time indicated by the search date/time data is latest. Then, the shop search server 12 executes the search processing illustrated in the above-mentioned Steps S101 to S105 based on the search condition (first-level search address element ID, second-level search address element ID, third-level search address element ID, and fourth-level search address element ID) included in the identified piece of search history data 54 and the narrowing-down condition corresponding to the product type selected by the user identified by the received data. In this manner, the shop search system 10 according to the first embodiment allows a narrowing-down search for identifying the shop data 48 that satisfies the narrowing-down condition based on the product type while maintaining the condition relating to the address. Once the user designates the condition relating to the address, the user can narrow down the search results corresponding to the address on another search condition such as the product type without having to designate the address again.

Then, in the first embodiment, under the condition that the number of pieces of shop data 48 identified as the search results of the narrowing-down search performed by the search processing execution section 30 is not equal to or larger than the predetermined number N, the search condition changing section 34 changes the search condition so as to cancel the association with the address element in the lowermost tier, and the search processing execution section 30 executes the search processing based on the changed search condition. Under the condition that the number of pieces of shop data 48 identified as the search results of the narrowing-down search performed by the search processing execution section 30 becomes equal to or larger than the predetermined number N, the search result information generation section 36 generates the search result screen 56 for showing the search results in a list form. Then, the information output section 22 outputs the search result screen 56 to the client 14. In this manner, in the shop search system 10 according to the first embodiment, even if the number of pieces of shop data 48 identified as the search results is below the predetermined number N as a result of the narrowing-down search based on a condition different from the address, the search processing based on the search condition that has been changed so as to cancel the association with the address element in the lowermost tier is executed, which allows the search result screen 56 to exhibit liveliness even if the narrowing-down search is performed.

Further, under the condition that the user clicks on the product type selection tab 64 corresponding to the desired type of product on the search result screen 56 illustrated in FIG. 9, the client outputs the narrowing-down condition corresponding to the selected product type to the shop search server 12 in association with the user ID. Then, the shop search server 12 receives this data. Then, in the same manner as in the above-mentioned processing, the shop search server 12 executes the search processing illustrated in the above-mentioned Steps S101 to S105 based on the first-level search address element ID, the second-level search address element ID, the third-level search address element ID, the fourth-level search address element ID, and the narrowing-down condition corresponding to the product type identified by the received data.

Further, under the condition that the user clicks on another product type selection tab 64 on the search result screen 56 showing the search results of the search processing based on the narrowing-down condition, the shop search server 12 executes the search processing illustrated in the above-mentioned Steps S101 to S105 in response to this operation, in the same manner as in the above-mentioned processing, based on the first-level search address element ID, the second-level search address element ID, the third-level search address element ID, the fourth-level search address element ID, and the narrowing-down condition corresponding to the product type obtained after the change. In this manner, in the shop search system 10 according to the first embodiment, under the condition that the user changes the selection of the product type selection tab 64, it is possible to switch the narrowing-down condition based on the product type while maintaining the condition relating to the address.

Under the condition that the user clicks on the shop name character string included in the shop-related information 58 on the search result screen 56 illustrated in FIG. 9, the shop search server 12 outputs, for example, an order placement screen (not shown) relating to the product handled by the shop corresponding to the shop-related information 58 to the client 14. Under the condition that the user executes an order placement operation for the product on the order placement screen, the shop search server 12 receives, for example, this order placement operation from the client 14, and notifies a mail address of a person in charge at the shop that an order has been placed through electronic mail or the like. In this manner, the shop search system 10 according to the first embodiment can be utilized, for example, as one module included in a delivery site that allows users to use food delivery/package delivery/on-site services online. Then, for example, the shop search system 10 receives the designation of the shop corresponding to the shop-related information 58, the product whose delivery is desired, and the like from the user, and notifies the shop that an order for the product and the like has been placed.

1-5. Modified Example of the First Embodiment

Note that, the present invention is not limited to the above-mentioned first embodiment.

Figure 10:
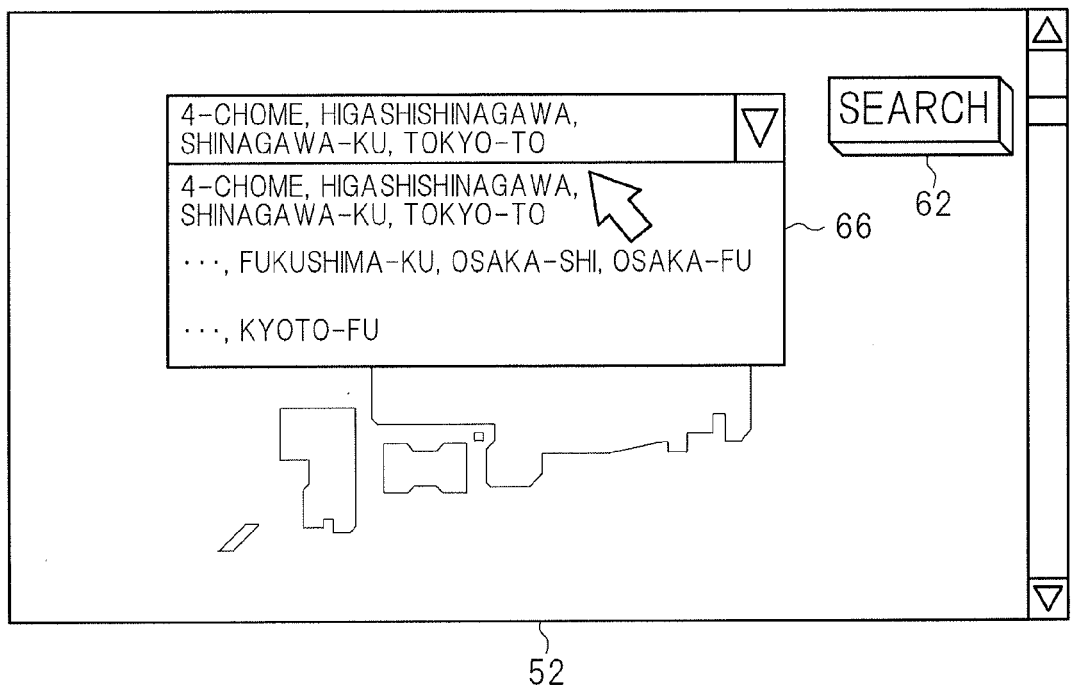
FIG. 10 A diagram illustrating an example of the search target area narrowing-down screen.

For example, the shop search server 12 may receive an output request for the search target area narrowing-down screen 52 associated with the user ID from the client 14, and in response to the output request, the information output section 22 may visually output the search target area narrowing-down screen 52 including a pull-down menu 66 and the search button 62, such as illustrated in FIG. 10, to the client 14. Each item included in the pull-down menu 66 corresponds to, for example, the search history data 54 stored in the history storage section 28. Shown as each item included in the pull-down menu 66 is, for example, the character string obtained by concatenating address character strings corresponding to the search condition (for example, combination of the first-level search address element ID, the second-level search address element ID, the third-level search address element ID, and the fourth-level search address element ID) relating to the area which is associated with the received user ID in the search history data 54. Further, each item included in the pull-down menu 66 is associated with an item ID. Further, in the shop search server 12 according to this embodiment, for example, a predetermined number of items are included in the pull-down menu 66 from the latest search history data 54.

In the shop search server 12 according to this embodiment, under the condition that the user selects any one of the items included in the pull-down menu 66 and clicks on the search button 62, the client 14 outputs the item ID corresponding to the item selected by the user which is associated with the user ID to the shop search server 12. Then, the shop search server 12 receives this item ID. Then, the search condition acquisition section 24 acquires the combination of the first-level search address element ID, the second-level search address element ID, the third-level search address element ID, and the fourth-level search address element ID corresponding to the received item ID. Then, the shop search server 12 executes the same processing as the above-mentioned Steps S101 to S106.

Further, for example, if the client 14 is provided with a GPS or the like, for example, the client 14 may transmit data on the address corresponding to the location of the user identified by the GPS or the like to the shop search server 12. Then, the search condition acquisition section 24 included in the shop search server 12 may identify the first-level search address element ID, the second-level search address element ID, the third-level search address element ID, and the fourth-level search address element ID, which correspond to the data on this address, as the search condition.

2. Second Embodiment

Hereinafter, a description is made of a product search system according to a second embodiment of the present invention being another embodiment of the present invention. The product search system according to the second embodiment has the same configuration as that of the shop search system 10 exemplified in FIG. 1 except that the shop search server 12 functions as a product search server in the shop search system 10 exemplified in FIG. 1. The product search server according to the second embodiment is a server utilized as one module included in electronic commerce system, and is used for searching for products and services to be dealt in the electronic commerce system.

FIG. 2 illustrates an example of functions implemented by the product search server according to the second embodiment. In the second embodiment, product category management data having a hierarchical structure and including a plurality of pieces of product category element data (substituting the address element data 46) is stored in place of the address management data 40 exemplified in FIG. 3. The product category element data includes a product category element ID (substituting the address element ID) being the identifier of the product category element data and a product category element character string (substituting the address element character string) being the character string indicating the name of the element of a product category (referred to as "product category element"). Further, the product category element data is associated with a parent product category element ID (substituting the parent address element ID) being the product category element ID of the product category element data in the immediately-upper tier and the tier level data indicating the depth of the tier of the product category element data. In the second embodiment, for example, the product category element ID is uniquely assigned to each piece of product category element data that shares the product category element data in the immediately-upper tier.

In the second embodiment, for example, the product category management data is data indicating the element of the product category belonging to any one of four tiers. The product category management data has a structure in which the category corresponding to the product category element in a lower tier is one of categories obtained by dividing the category corresponding to the product category element in the upper tier. For example, the categories of products and services are managed in the product category management data in such a manner that the first tier is "water/soft drink", the second tier is "water/mineral water", the third tier is "domestic famous water", and the fourth tier is "Water in xx" being a product name. In this manner, in the second embodiment, the categories of the products are managed in four tiers.

Then, in the second embodiment, product data is stored in the data storage section 20 in place of the shop data 48 exemplified in FIG. 4. The product data includes a product/service ID (substituting the shop ID) being the identifier of a product or service, a product name character string (substituting the shop name character string) being the character string indicating the name of the product or service, a product category character string (substituting shop address character string) obtained by concatenating from the character string indicating an uppermost-level category of the product or service to the character string indicating a lowermost-level category thereof, and corresponding product category element group data (substituting the corresponding address element group data) corresponding to a combination of the product category element data corresponding to the category of the product or service. In the second embodiment, the corresponding product category element group data includes a first-level product category element ID, a second-level product category element ID, a third-level product category element ID, and a fourth-level product category element ID (substituting the first-level address element ID, the second-level address element ID, the third-level address element ID, and the fourth-level address element ID, respectively), comment data indicating a comment to be displayed as the search result, attribute data including a character string indicating a price of the product or service and an image of the product or service, and the like.

Further, in the second embodiment, the account management data 44 exemplified in FIG. 5 is stored in the data storage section 20 as well.

Then, in the same manner as in the processing for acquiring the search condition regarding the address elements through the search target area narrowing-down screen 52 in the first embodiment, in the second embodiment, a combination of a first-level search product category ID, a second-level search product category ID, a third-level search product category ID, and a fourth-level search product category ID (substituting the combination of the first-level search address element ID, the second-level search address element ID, the third-level search address element ID, and the fourth-level search address element ID in the first embodiment) is acquired in processing using a search target product category narrowing-down screen.

Then, in the second embodiment, the search processing execution section 30 executes the same search processing as the processing illustrated in the above-mentioned Steps S101 to S106 (FIG. 7) except that the respective pieces of data in the first embodiment are replaced by the respective pieces of data in the second embodiment as described above.

For example, in the processing illustrated in Step S101, the search history data generation/output section 26 generates search history data including the user ID, the search condition acquired by the search condition acquisition section 24 (such as a first-level search product category element ID), and the search date/time data, and outputs the search history data to a history storage section. Then, in the processing illustrated in Step S102, the search processing execution section 30 identifies the product data associated with respectively corresponding product category elements in all the tiers that correspond to the product category elements included in the search condition. Then, in the processing illustrated in Step S103, the condition determination section 32 determines whether or not the number of pieces of product data identified in the processing illustrated in Step S102 is equal to or larger than the predetermined number N. Then, in the processing illustrated in Step S104, the search condition changing section 34 changes the search condition so as to cancel the association with the product category element in the lowermost tier. Then, in the processing illustrated in Step S105, the search result information generation section 36 generates a search result screen. This search result screen is the same as the search result screen 56 exemplified in FIG. 9 except that a plurality of pieces of product corresponding information corresponding to the product data being the search results are included in place of the shop-related information 58, that price range selection check boxes each associated with a price range of the product are included in place of the product type selection check boxes 60, and that price range selection tabs each associated with the price range of the product are included in place of the product type selection tabs 64. Then, in the processing illustrated in Step S106, the information output section 22 visually outputs the above-mentioned search result screen on the display provided to the client 14. In this manner, in the second embodiment, in the same manner as in the first embodiment, the number of pieces of product corresponding information included in the search result screen can be maintained at equal to or larger than the predetermined number N.

In the second embodiment, the narrowing-down condition corresponding to the price range corresponds to the narrowing-down condition corresponding to the product type in the first embodiment. In the second embodiment, under the condition that the user clicks on the search button with at least one price range selection check box, which corresponds to the desired price range, being selected, or under the condition that the user clicks on the price range selection tab corresponding to the desired price range, in the same manner as in the first embodiment, the search processing is executed based on the search condition included in the search history data in which the date/time indicated by the search date/time data is latest and the narrowing-down condition corresponding to the price range selected by the user.

In this manner, in the second embodiment, even if the number of pieces of product data identified as the search results is below the predetermined number N as a result of the narrowing-down search performed on a condition different from the category of the product or service, the search processing is executed based on the search condition changed so as to cancel the association with the element in the lowermost tier, which allows the search result screen to exhibit liveliness even if the narrowing-down search is performed. Further, in the second embodiment, even if the user erroneously designates the selection of the product category, there is a situation in which the product desired by the user is output as the search result, and hence the user's selection of the product category can be recovered from the erroneous selection.

3. Modified Example

Note that, the present invention is not limited to the above-mentioned embodiments.

For example, under the condition that the narrowing-down condition is changed by the selection of the check box or the switching of the tab, the above-mentioned shop search system 10 and the above-mentioned product search system may execute the search processing again by using the search condition saved as a session object in the server or the search condition saved as a cookie in the client 14, instead of executing the search processing again by using the search condition extracted from the search history data 54.

For example, in the first embodiment, under the condition that the shop search system 10 executes the search processing illustrated in the above-mentioned Steps S101 to S106, the first-level search address element ID, the second-level search address element ID, the third-level search address element ID, and the fourth-level search address element ID may be saved in the shop search server 12 as a session object, or may be saved in the client 14 as a cookie. Further, for example, in the second embodiment, under the condition that the product search system executes the same search processing as in the above-mentioned Steps S101 to S106, the first-level search product category element ID, a second-level search product category element ID, a third-level search product category element ID, and a fourth-level search product category element ID may be saved in the product search server as a session object, or may be saved in the client 14 as a cookie.

As long as a session (for example, HTTP session) between the client 14 and the server continues, the search processing may be executed by using the search condition saved in the server as the session object or the search condition saved in the client 14 as the cookie under the condition that the narrowing-down condition is changed by the selection of the check box or the switching of the tab.

Further, for example, in the above-mentioned embodiments, the user is identified by the user ID, but the client 14 or a web browser can be identified by using the identifier for identifying the client 14 or the identifier for identifying the web browser installed in the client 14, instead of the user ID.

Further, for example, even if the number of pieces of shop data 48 or product data identified as the search results of the above-mentioned narrowing-down search is not equal to or larger than the predetermined number N, the shop search server 12 or the product search server may output the search result screen corresponding to the search results of the narrowing-down search to the client 14 without changing the search condition so as to cancel the association with the element in the lowermost tier or executing the search processing based on the changed search condition.

Further, the assignment of roles between the server and the client 14 in the shop search system 10 and the product search system is not limited to each of the above-mentioned embodiments. Further, the above-mentioned embodiments may be applied to, for example, general search systems for searching data by using academic categories or scientific categories (specifically, for example, search system for books, articles, prior art documents, or judicial precedents). Further, the above-mentioned specific numerical values and character strings are given by way of example, and the present invention is not limited to those numerical values and character strings.

The invention claimed is:

1. A search system, comprising:
   at least one memory operable to store program code;
   at least one processor operable to read the program code and operate as instructed by the program code, the program code including:
   address management data storage code configured to cause the at least one processor to store, in an address management data storage, pieces of address element data in a hierarchical structure corresponding to a preset number of tiers, each address element data including an address element character string, the address element character string indicating a name of an element of an address, and an address element identification (ID) associated with the address element character string;
   search target data storage code configured to cause the at least one processor to store, in a search target data storage, pieces of search target data, each of which is a shop data comprising a shop ID of a shop and address element IDs corresponding to an address of the shop, the address element IDs being in a hierarchical structure of the preset number of tiers;
   acquisition code configured to cause the at least one processor to acquire geographic information designated by a user;
   search processing execution code configured to cause the at least one processor to identify, among the pieces of search target data stored in the search target data storage, pieces of the search target data associated with a geographic element group comprising the address element IDs that respectively match, in all the preset number of tiers, to the address element IDs corresponding to the geographic information acquired by the acquisition code;
   search result information output code configured to cause the at least one processor to output, under a condition that a number of the identified pieces of search target data is equal to or larger than a predetermined number, search result information comprising the identified pieces of search target data; and
   excluding code configured to cause the at least one processor to exclude, under a condition that the number of the identified pieces of search target data is not equal to or larger than the predetermined number, an address element ID in a lowermost tier among the preset number of tiers from the address element IDs corresponding to the geographic information, wherein the search processing execution code causes the at least one processor to identify, under a condition that the address element ID in the lowermost tier is excluded by the excluding code, pieces of the search target data associated with the geographic element group comprising the address element IDs that respectively match, in all the preset number of tiers except for the lowermost tier, to the address element IDs after the exclusion additionally, wherein the search result information output code causes the at least one processor to output, under a condition that the address element ID in the lowermost tier is excluded by the excluding code, the search result information comprising both of the search target data identified based on the address element IDs before the exclusion and the search target data identified based on the address element IDs after the exclusion mixedly, and wherein the search result information output code causes the at least one processor to output, under a condition that the processing to identify pieces of the search target data associated with the address element IDs after the exclusion is executed, the search result information in which the search target data identified by the processing is arranged below the search target data identified before the execution of the processing.

2. The search system according to claim 1, wherein the excluding code and the search processing execution code cause the at least one processor to repeatedly exclude an address element ID in a next lowermost tier from the address element IDs corresponding to the geographic information and identify pieces of the search target data associated with the geographic element group comprising the address element IDs that respectively match to the address element IDs, which are remaining after the exclusion additionally, until the number of identified pieces of the search target data identified as search results becomes equal to or larger than the predetermined number.

3. The search system according to claim 1, wherein:
the search condition acquisition code causes the at least one processor to acquire a narrowing-down condition different from the geographic information; and
the search processing execution code causes the at least one processor to identify pieces of the search target data that satisfies the narrowing-down condition as well.

4. The search system according to claim 3, wherein:
the geographic element group which have been used for the processing to identify the search target data by the search processing execution code is savable; and further comprises
receiving code configured to cause the at least one processor to receive, in response to a select operation to one of alternatives respectively corresponding to the narrowing-down conditions, a change request for the narrowing-down condition, and wherein
the search processing execution code configured to cause the at least one processor to identify, under a condition that the change request for the narrowing-down condition is received, pieces of the search target data associated with the saved geographic element group and the narrowing-down condition corresponding to the selected alternative.

5. The search system according to claim 1, further comprising code configured to cause the at least one processor to generate search history data including a user identification (ID) of the user, the geographic element group used in the processing to identify pieces of the search target data by the search processing execution code, and search time information indicating at least one of a date and a time at which the processing is executed, and storing the user ID, the geographic element group, and the search time information, in association with one another, to a history storage configured to store the geographic element group used in the processing to identify pieces of the search target data,
wherein the search processing execution code causes the at least one processor to identify pieces of the search target data that are associated with geographic element group designated from among the geographic element groups stored in the history storage.

6. The search system according to claim 1, wherein:
the hierarchical structure of the address element IDs included in the shop data is such a structure that an area corresponding to the address element ID in a lower tier is one partition obtained by dividing an area corresponding to the address element ID in an upper tier.

7. A search method, comprising:
address management data storage step of storing pieces of address element data in a hierarchical structure corresponding to a preset number of tiers, each address element data including an address element character string, the address element character string indicating a name of an element of an address, and an address element identification (ID) associated with the address element character string;
search target data storage step of storing pieces of search target data, each of which is a shop data comprising a shop ID of a shop and address element IDs corresponding to an address of the shop, the address element IDs being in a hierarchical structure of the preset number of tiers;
an acquisition step of acquiring, by a computer, geographic information designated by a user;
a search processing execution step of identifying, among the pieces of search target data stored in the search target data storage, pieces of the search target data associated with a geographic element group comprising the address element IDs that respectively match, in all the preset number of tiers, to the address element IDs corresponding to the geographic information acquired in the acquisition step;
a search result information output step of outputting, by the computer, under a condition that a number of the identified pieces of search target data is equal to or larger than a predetermined number, search result information comprising the identified pieces of search target data; and
an excluding step of excluding, by the computer, under a condition that the number of the identified pieces of search target data is not equal to or larger than the predetermined number, a geographic element in a lowermost tier among the preset number of tiers from the address element IDs corresponding to the geographic information,
wherein the search processing execution step comprises a step of identifying, under a condition that the geographic element in the lowermost tier is excluded in the excluding step, pieces of the search target data associated with the geographic element group comprising the address element IDs that respectively match, in all the preset number of tiers except for the lowermost tier, to the address element IDs after the exclusion additionally,
wherein the search result information output step comprises a step of outputting, under a condition that the geographic element in the lowermost tier is excluded in the excluding step, the search result information comprising both of the search target data identified based on the address element ID before the exclusion and the search target data identified based on the address element IDs after the exclusion mixedly, and
wherein the search result information output step comprises a step of outputting, under a condition that the processing to identify pieces of the search target data associated with the address element IDs after the exclusion is executed, the search result information in which the search target data identified by the processing is arranged below the search target data identified before the execution of the processing.

8. A non-transitory storage medium having a search program stored thereon, the search program causing a computer to:
store, in an address management data storage, pieces of address element data in a hierarchical structure corresponding to a preset number of tiers, each address element data including an address element character string, the address element character string indicating a name of an element of an address, and an address element identification (ID) associated with the address element character string;

store, in a search target storage, pieces of search target data, each of which is a shop data comprising a shop ID of a shop and address element IDs corresponding to an address of the shop, the address element IDs being in a hierarchical structure of the preset number of tiers;

acquire geographic information designated by a user;

identify, among the pieces of search target data stored in the search target data storage, pieces of the search target data associated with a geographic element group comprising the address element IDs that respectively match, in all the preset number of tiers, to the address element IDs corresponding to the geographic information in all the preset number of tiers;

output, under a condition that a number of the identified pieces of search target data is equal to or larger than a predetermined number, search result information comprising the identified pieces of search target data; and exclude, under a condition that the number of the identified pieces of search target data is not equal to or larger than the predetermined number, a geographic element in a lowermost tier among the preset number of tiers from the address element IDs corresponding to the geographic information, wherein the search program further causes the computer to identify, under a condition that geographic element in the lower most tier is excluded, pieces of the search target data associated with the geographic element group comprising the address element IDs that respectively match, in all the preset number of tiers except for the lowermost tier, to the address element IDs after the exclusion additionally, wherein the search program further causes the computer to output, under a condition that the geographic element in the lowermost tier is excluded, the search result information comprising both of the search target data identified based on the address element IDs before the exclusion and the search target data identified based on the address element IDs after the exclusion mixedly, and wherein the search program further causes the computer to output, under a condition that the processing to identify pieces of the search target data associated with the address element IDs after the exclusion is executed, the search result information in which the search target data identified by the processing is arranged below the search target data identified before the execution of the processing.

9. The search system according to claim 5, wherein when a narrowing-down condition different from the geographic information is input in association with the user ID, the search processing execution code causes the at least one processor to identify pieces of the search target data associated with the geographic element group associated with the user ID stored in the history storage and satisfying the narrowing-down condition associated with the user ID.

\* \* \* \* \*